June 27, 1961     W. T. DENNISON     2,990,202
LABYRINTH FACE SEAL PLATE
Filed Sept. 18, 1958
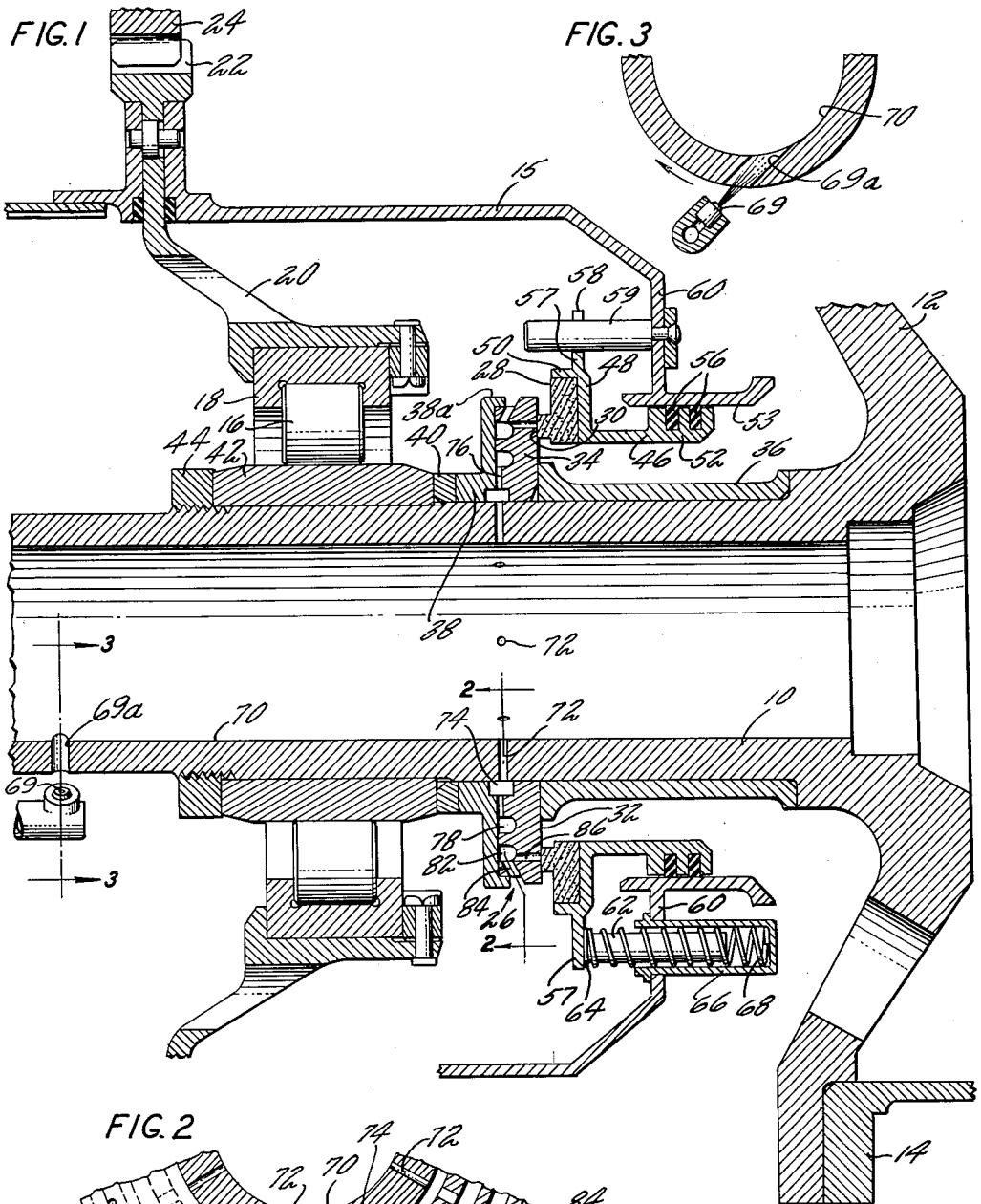
INVENTOR
WILLIAM T. DENNISON
BY M. B. Tasker
ATTORNEY

United States Patent Office 2,990,202
Patented June 27, 1961

2,990,202
LABYRINTH FACE SEAL PLATE
William T. Dennison, East Hartford, Conn., assignor to United Aircraft Corporation, East Hartford, Conn., a corporation of Delaware
Filed Sept. 18, 1958, Ser. No. 761,801
10 Claims. (Cl. 286—19)

This invention relates to improved means for cooling rotating frictionally-engaging members which operate in a hot environment such, for example, as fluid seals, bearing races, slip rings and the like used in gas turbine engines and other high-speed and high-temperature rotating apparatus.

It is an object of this invention to provide improved cooling means for such rotating devices.

Another object of this invention is to provide a labyrinth passage in a member to be cooled over the surfaces of which a very thin film of high velocity cooling fluid is caused to flow in intimate contact.

A further object of this invention is generally to improve the construction and operation of frictionally-engaging high-temperature, high-speed rotating members.

These and other objects and advantages of the invention will be evident or will be pointed out in connection with the following description of the preferred embodiment of the invention shown in the accompanying drawing.

In this drawing:

FIG. 1 is a longitudinal sectional elevation of a portion of a gas turbine engine illustrating a seal assembly constructed in accordance with this invention;

FIG. 2 is a sectional detail on line 2—2 of FIG. 1; and

FIG. 3 is a detail view showing the means for introducing cooling fluid into the axial passage of the rotating shaft.

As herein shown, 10 is the main shaft connecting the compressor of a gas turbine engine with the turbine, only the hub 12 and a section of one turbine disc 14 of the turbine being shown. Surrounding shaft 10 is a supporting casing 15 which encloses a portion of this shaft and houses a roller bearing 16 for the shaft. The outer race 18 of the bearing is carried by a supporting web 20 which has an annular spline connection at 22 with a circular diaphragm 24 carried by the outer casing of the engine (not shown).

The seal assembly, generally indicated at 26, includes an annular nonrotating seal member 28 that engages a cooperating rotating seal plate 34. Seal member 28, which may be of the carbon variety, has a reduced annular seal face 30 which engages the face 32 of rotating seal plate 34. Seal plate 34 is mounted on shaft 10 for rotation therewith by means of a sleeve 36 which engages a shoulder on hub 12 and an abutting backing plate 38 against which seal plate 34 is held in firm engagement by a ring 40 which abuts the inner bearing race 42. Backing plate 38 has a peripheral flange 38a which cooperates with shaft 10 to form a shallow recess to accurately locate and support the seal plate. A nut 44 is threaded onto a slightly enlarged portion on shaft 10 so as to abut bearing race 42. Thus, bearing race 42, ring 40, and seal plate 34 are all rigidly mounted on shaft 10 and rotate therewith.

The nonrotating seal member 28 is mounted on an annular flanged seal supporting member 46 having a radial backing plate 48 for the seal member and an annular flange 50 which with the backing plate forms an annular recess which supports the seal member. Seal supporting member 46 has an annular tubular portion which is coaxial with shaft 10 and terminates in an enlarged annular external thickened ring 52. Ring 52 slides within a tubular coaxial housing 53 integral with casing 15, suitable annular seal rings 56 being provided in radial grooves in ring 52 which engage the inner wall of housing 53.

It will thus be evident that seal supporting member 46 is free to move axially to the right or left (FIG. 1), as is supporting ring 52, and slides within the housing 53 to maintain the annular seal face 30 in contact with the face 32 of the rotating seal plate 34.

Means are also provided for holding the seal supporting member 46 against rotation while permitting the above-described axial movement thereof relative to the rotating seal plate 34. For this purpose, member 46 is provided with a radial flange 57 which has a plurality of spaced peripheral slots 58 designed to receive a plurality of stationary horizontal pins 59 arranged in a circle on a wall 60 of casing 15. Also arranged in the same circle on wall 60 and alternating with the pins 59 are a plurality of pins 62 provided with pads 64 on their extremities which engage the radial flange 57 between the holes 58. These pins are axially reciprocable in a series of tubular housings 66 which are mounted in apertures in wall 60. The tubular housings 66 are sufficiently larger in diameter than the diameter of pins 62 to receive compression springs 68 therein surrounding the pins. One end of each spring 68 engages the closed end of its tubular housing 66, while the other end engages the pad 64 formed integral with the pin with the results that pins 62 are constantly urged out of the housings 66 against flange 57 to press the nonrotating seal member 28 into engagement with the rotating seal plate 34.

The seal assembly 26 is exposed to the turbine cooling air which enters at a high temperature. Also, due to the high speed of rotation of the seal plate 34 relative to the nonrotating seal member 28, considerable heat is generated in the seal plate and in the seal member which must be dissipated. Accordingly, means are provided for transferring heat from the seal plate 34 at such a high rate that the cooperating frictionally-engaging seal member and seal plate are maintained at a safe operating temperature.

In accordance with this invention, cooling fluid, which may be oil, is introduced in the form of a jet from nozzle 69 into passages 69a in hollow shaft 10. The fluid flows through axial passage 70 in shaft 10 and passes by centrifugal force through a plurality of relatively small diameter radial holes 72 in the shaft into an annular chamber 74 formed by registering annular grooves in the back of the seal plate 34 and the confronting surface of backup plate 38. Chamber 74, in turn, communicates through radial grooves 76 in the back of seal plate 34 with an annular groove 78 in seal plate 34. From annular groove 78, the cooling fluid moves by centrifugal force through radial grooves 80 into a second annular groove 82 in the back of the seal plate. Fluid in groove 82 is discharged from the seal plate through a plurality of oblique grooves 84. It will be noted from FIG. 2 that the grooves 84 extend obliquely to the radius of the seal plate in a direction away from the direction of rotation of the seal plate, as indicated by the arrow in FIG. 2, to provide a pumping action tending to accelerate the flow of the fluid. It will also be noted that radial grooves 76 and 80, as well as annular grooves 78 and 82, are closed by backing plate 38 and hence are in effect closed passages.

The radial passages 76 which lead into annular chamber 78 and the radial passages 80 which lead to annular chamber 82 are staggered, so that a direct flow of fluid through the seal plate is impossible. Also, a plurality of small lubricating passages 86 are provided which extend from annular chamber 82 through the seal plate 34 and terminate at the annular area of engagement of the face 30 of seal member 28 with the face 32 of the seal plate.

In operation, cooling fluid from the interior of shaft 10 flows at high velocity under the action of centrifugal force through radial passages 72 in the shaft into an annular groove 74, scrubbing one side of passages 72 and the outer surface of groove 74. From this groove, the fluid flows at very high velocity through the generally radial passages 76 and, due to the fact that the seal plate member 74 is rotating at very high velocity, is forced to scrub along the surface of one side wall of the passage 76. It is then thrown by centrifugal force against the outside wall of passage 78 and due to the motion of rotation of the seal plate scrubs along this outside wall at high velocity. Fluid in annular passage 78 is then forced by centrifugal action through the radial passages 80 where it again scrubs along one side wall of these passages and enters annular chamber 82. The cooling fluid scrubs along the outer wall of this latter passage until it passes through the oblique passages 84 where it again scrubs one side of these passages as a result of the high rotational velocity of the seal plate. It will be evident that as the oil flows at very high velocity over the sides of the radial passages and the outer surfaces of the annular passages in very intimate contact therewith, it is possible to remove heat from the seal plate at a high rate. In fact, it has been found that a thin film of cooling oil flowing at high velocity and held in intimate contact with the surface to be cooled will remove far more heat than a solid stream of cooling fluid which nearly or completely fills the passage. It is believed that in the latter case the friction of the surfaces slows down the boundary layer of the fluid stream so that, in fact, this stagnant boundary layer of oil insulates the surfaces to be cooled from the cooling stream.

It will be evident that as a result of the present invention the cooling oil will be directed in limited quantities through the relatively small passages 72 into the labyrinth passages of the seal plate, where by centrifugal force it is caused to scrub over the large surface area of the seal plate as a thin film in intimate contact therewith and remove heat from the seal plate at a very rapid rate.

It will also be evident that the construction provided is a relatively simple one which requires no special means for moving the fluid or controlling its flow through the seal plate.

While only one embodiment of the invention has been illustrated and described herein, it will be understood that various changes can be made in the construction and arrangement of the parts without exceeding the scope of the invention.

I claim:

1. In combination, a rotatable shaft having a longitudinal passage therein, a casing through which said shaft extends, a nonrotatable face seal member carried by said casing, a cooperating face seal plate carried by said shaft and rotatable therewith, said rotatable seal plate having a plurality of radially spaced interconnected concentric grooves therein, means for introducing cooling fluid into said longitudinal passage in said shaft, means for providing fluid communication between the passage in said shaft and the innermost of said grooves, and means for discharging said fluid from the outermost of said grooves.

2. In combination, a rotatable shaft having a longitudinal passage therein, a casing through which said shaft extends, a nonrotatable face seal member carried by said casing, a cooperating face seal plate carried by said shaft and rotatable therewith, means for introducing a cooling fluid into said longitudinal passage in said shaft, means for passing a thin film of cooling fluid at very high velocity from said longitudinal passage through said rotatable seal plate including a plurality of radially spaced concentric passages in said rotatable seal plate, means for providing fluid communication between said longitudinal passage and the innermost annular passage in said plate, passage means between adjacent passages, and passage means extending from the outermost of said passages to the periphery of said plate.

3. In combination, a rotatable shaft having a longitudinal passage therein, a casing through which said shaft extends, a nonrotatable face seal member carried by said casing, a cooperating face seal plate carried by said shaft and rotatable therewith, means for introducing a cooling fluid into said longitudinal passage in said shaft, means for passing a thin film of cooling fluid at very high velocity from said longitudinal passage through said rotatable seal plate including a plurality of radially spaced concentric passages in said rotatable seal plate, means for providing fluid communication between said longitudinal passage and the innermost annular passage in said plate, passage means between adjacent passages, and passage means extending from the outermost of said passages to the periphery of said plate, said last-mentioned passage means being oblique to the radii of said plate in a direction away from the direction of rotation of said plate.

4. In combination, a rotatable shaft having a longitudinal passage therein, a casing through which said shaft extends, a nonrotatable face seal member carried by said casing, a cooperating seal plate carried by said shaft and rotatable therewith, said seal plate having two generally parallel annular faces, one of which is engaged by said nonrotatable seal member, a plurality of concentric grooves in the other face of said seal plate, a plurality of holes in said shaft providing fluid communication between said longitudinal passage and the innermost of said annular grooves, generally radial passage means providing fluid communication between adjacent annular grooves, a backing plate overlying said grooved face and rotatable with said seal plate, and passage means extending between the outermost annular groove and the periphery of said seal plate.

5. Face seal means for use between a rotatable shaft and a casing wall through which said shaft extends including cooperating annular rotatable and nonrotatable face seal members carried by said shaft and casing wall, said rotatable member having labyrinth cooling means comprising a plurality of radially spaced annular passages therein, generally radial passages interconnecting said annular passages, and means for moving a thin film of cooling fluid over the surfaces of said annular and radial passages at high velocity due to centrifugal force resulting from the rotation of said rotatable member including means for introducing cooling fluid into the innermost of said annular passages, and means for discharging said fluid from the outermost of said annular passages.

6. Face seal means for sealing the space between a rotatable shaft having a longitudinal passage and a casing wall through which said shaft extends including cooperating annular rotating and nonrotating face seal members, one of said members having a labyrinth cooling means comprising a plurality of annular passages therein, generally radial passages interconnecting said annular passages at spaced peripheral points, the radial passages between pairs of adjacent annular passages being staggered, means for introducing cooling fluid from said longitudinal passage to the innermost of said annular passages, and means for discharging said fluid from the outermost of said annular passages.

7. In combination, a casing, a shaft extended through a wall of said casing, said shaft having a longitudinal passage therein, sealing means between said casing and said shaft including an annular face seal member carried by said casing and a cooperating annular seal means carried by said shaft and rotatable therewith, said rotatable seal means having a plurality of radially spaced annular passage means therein and generally radial passage means connecting adjacent annular passage means, passage means connecting said longitudinal passage in said shaft with the innermost annular passage means, and passage means extending from the outermost of said annular passage means to the periphery of said rotatable seal means.

8. Face seal means for use between a rotatable shaft and a casing wall through which said shaft extends including cooperating annular rotatable and nonrotatable face seal members, said rotatable face seal member having two generally parallel faces, one of which confronts and is engaged by said nonrotatable seal member, a series of radially spaced annular grooves in the other of said faces, radial grooves connecting adjacent grooves in said rotatable member, means for introducing cooling fluid into the innermost of said annular grooves, means for discharging said fluid from the outermost of said annular grooves to the periphery of said rotatable seal member, and a backing plate also rotatable with said shaft overlying said other face and forming a closure for the open sides of said grooves.

9. Face seal means for use between a rotatable shaft and a casing wall through which said shaft extends including cooperating annular rotatable and nonrotatable face seal members, an annular backing plate rotatable with said shaft having a peripheral flange, said backing plate forming with said shaft an annular recess for supporting said rotatable face seal member in position to engage said nonrotatable seal member, a labyrinth passage between said rotatable seal member and said backing plate for circulating cooling fluid at high velocity under the action of centrifugal force, a longitudinal passage in said shaft, means providing for fluid communication between said longitudinal passage and said labyrinth passage, and means for introducing cooling fluid to said longitudinal passage.

10. Face seal means for use between a rotatable shaft and a casing wall through which said shaft extends including cooperating rotatable and nonrotatable face seal members carried by said shaft and casing wall, said nonrotatable seal member having an annular face and said rotatable seal member having two generally parallel annular faces, one of which engages said annular face of said nonrotatable seal member, said rotatable seal member having labyrinth cooling means on the other of its annular faces comprising a plurality of radially spaced and interconnected annular passages therein, means for introducing cooling fluid into the innermost of said annular passages, and a passage extending through said rotatable seal member from one of said annular passages which terminates at the annular face of said nonrotatable seal member.

References Cited in the file of this patent

UNITED STATES PATENTS

| | | |
|---|---|---|
| 1,074,259 | Gordon | Sept. 10, 1913 |
| 1,876,515 | Emmet | Sept. 6, 1932 |
| 2,801,117 | Bourgeois et al. | July 30, 1957 |
| 2,857,182 | Bain et al. | Oct. 21, 1958 |

FOREIGN PATENTS

| | | |
|---|---|---|
| 682,486 | Great Britain | Nov. 12, 1952 |